(12) United States Patent
Park (10) Patent No.: US 9,610,939 B2
(45) Date of Patent: Apr. 4, 2017

(54) APPARATUS AND METHOD FOR CONTROLLING CLUTCH OF HYBRID VEHICLE

(71) Applicants: Hyundai Motor Company, Seoul (KR); Kia Motors Corporation, Seoul (KR)

(72) Inventor: Joonyoung Park, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 14/546,092

(22) Filed: Nov. 18, 2014

(65) Prior Publication Data

US 2015/0344025 A1 Dec. 3, 2015

(30) Foreign Application Priority Data

Jun. 2, 2014 (KR) .................. 10-2014-0067185

(51) Int. Cl.
*B60W 10/02* (2006.01)
*B60W 10/06* (2006.01)
(Continued)

(52) U.S. Cl.
CPC .............. *B60W 20/40* (2013.01); *B60K 6/48* (2013.01); *B60W 10/02* (2013.01); *B60W 10/06* (2013.01); *B60W 10/08* (2013.01); *F16H 61/688* (2013.01); *B60K 2006/4825* (2013.01); *B60W 2050/0096* (2013.01); *B60W 2510/0638* (2013.01); *B60W 2510/081* (2013.01);
(Continued)

(58) Field of Classification Search
CPC ...... B60W 20/40; B60W 10/02; B60W 10/06; B60W 10/08; B60K 6/48; F16H 61/688; Y10S 903/93
See application file for complete search history.

(56) References Cited

U.S. PATENT DOCUMENTS

| 2012/0065819 A1* | 3/2012 | Christman | B60W 30/192 701/22 |
| 2013/0297105 A1* | 11/2013 | Yamazaki | B60K 6/48 701/22 |
| 2015/0025724 A1* | 1/2015 | Yamazaki | B60W 10/06 701/22 |

FOREIGN PATENT DOCUMENTS

| JP | 4462170 | 5/2010 |
| JP | 2010-188785 | 9/2010 |

(Continued)

*Primary Examiner* — Aaron L Troost
(74) *Attorney, Agent, or Firm* — Mintz Levin Cohn Ferris Glovsky and Popeo, P.C.; Peter F. Corless (57) ABSTRACT

An apparatus and method for controlling a clutch of a hybrid vehicle are provided. The method includes: setting, by a controller, a limited torque to a motor torque and comparing an input speed of the transmission and a minimum speed of the engine when converting from an EV driving mode to an HEV driving mode. The controller is configured to start the engine when the input speed of the transmission is equal to or greater than a minimum threshold point and is equal to or less than a minimum speed of the engine. Further, the method includes increasing the motor torque to exceed the preset limited torque, coupling the first clutch when the engine speed and a motor speed are synchronized, and coupling the second clutch when the input speed of the transmission exceeds the minimum speed of the engine by the controller.

13 Claims, 4 Drawing Sheets

(51) Int. Cl.
    *B60W 20/00*     (2016.01)
    *B60W 10/08*     (2006.01)
    *B60K 6/48*     (2007.10)
    *F16H 61/688*     (2006.01)
    *B60W 20/40*     (2016.01)
    *B60W 50/00*     (2006.01)

(52) U.S. Cl.
    CPC ............... *B60W 2510/1015* (2013.01); *B60W 2710/021* (2013.01); *B60W 2710/083* (2013.01); *Y02T 10/623* (2013.01); *Y02T 10/6221* (2013.01); *Y02T 10/6243* (2013.01); *Y02T 10/6286* (2013.01); *Y10S 903/93* (2013.01)

(56) References Cited

FOREIGN PATENT DOCUMENTS

| | | |
|---|---|---|
| KR | 10-2009-0039327 A | 4/2009 |
| KR | 10-2011-0062133 | 6/2011 |
| KR | 10-1393562 B1 | 5/2014 |

\* cited by examiner

APPARATUS AND METHOD FOR CONTROLLING CLUTCH OF HYBRID VEHICLE

CROSS-REFERENCE TO RELATED APPLICATION

This application claims priority to and the benefit of Korean Patent Application No. 10-2014-0067185 filed on Jun. 2, 2014, the entire contents of which are incorporated herein by reference.

BACKGROUND (a) Field of the Invention

The present invention relates to an apparatus and method for controlling a clutch within a hybrid vehicle, and more particularly, the present invention relates to an apparatus and method for controlling a clutch within a hybrid vehicle that sets a limited torque to the motor torque and converts a mode of the hybrid vehicle using a slip of a Dual Clutch Transmission (DCT), when converting a driving mode of the hybrid vehicle, which a DCT is mounted within, from an Electric Vehicle (EV) driving mode to a Hybrid Electric Vehicle (HEV) driving mode.

(b) Description of the Related Art

A hybrid vehicle is a vehicle that uses two or more different types of power sources. Generally, the hybrid vehicle is driven by an engine that obtains a driving torque by burning fuel and a motor that obtains a driving torque from battery power. A hybrid vehicle may be formed in various structures that use an engine and an electric motor as a power source. A vehicle that uses an electric motor to directly transfer engine mechanical power to a wheel and is operated using power from a battery is called a parallel hybrid vehicle. Further, a vehicle that drives an electric motor or charges electric power to a battery by converting engine mechanical power to electrical power using a generator is called a series hybrid vehicle. Within the parallel hybrid vehicle, an engine and a motor may be connected by an engine clutch, a DCT may be connected to a shaft of the engine and the motor, and a transmission may be connected to the DCT.

A major driving mode of the hybrid vehicle includes an EV mode, in which an engine clutch is uncoupled and is only driven with a motor, an HEV mode, that drives an engine and a motor together coupled with the engine clutch, and a slip driving mode, that may not completely couple the engine clutch within the HEV mode and that transfers an engine torque when rotation speeds of the engine and the motor are different. Particularly, conversion between an EV mode and an HEV mode is a major function of the hybrid vehicle and may have an influence on driving performance, fuel consumption, and power performance of the hybrid vehicle.

When a hybrid vehicle starts, a motor is driven by power charged within a battery and a driving torque generated within the motor. Further, a DCT is completely coupled within the hybrid vehicle to transfer power to a driving shaft. However, to convert from an EV mode, when a motor and a DCT are coupled, to an HEV mode, a coupling force of the DCT is reduced to generate slip of the DCT and acceleration linearity (e.g., acceleration adjusts linearly) may decrease. Further, acceleration linearity may even decrease when a motor and an engine synchronize and a wheel torque decreases.

The above information disclosed in this section is merely for enhancement of understanding of the background of the invention and therefore it may contain information that does not form the prior art that is already known in this country to a person of ordinary skill in the art.

SUMMARY

The present invention provides an apparatus and method that controls a clutch of a hybrid vehicle by setting a limited torque to the motor torque and converting a hybrid vehicle mode that uses slip of a DCT, when converting a hybrid vehicle driving mode from an EV driving mode to an HEV driving mode.

An exemplary embodiment of the present invention provides a method for controlling a clutch of a hybrid vehicle. The hybrid vehicle may include a motor selectively connected to a transmission via a second clutch and an engine. Further, the engine may be selectively connected to the motor via a first clutch. The method may include: limiting an output of a motor torque; comparing an input speed of the transmission and a minimum speed of the engine when converting from an EV driving mode to an HEV driving mode; starting the engine when the input speed of the transmission is equal to or greater than a minimum threshold point and is equal to or less than a minimum speed of the engine; increasing the motor torque to exceed the preset limited torque; coupling the first clutch when the engine speed and a motor speed are synchronized; and coupling the second clutch when the input speed of the transmission exceeds the minimum speed of the engine. The starting of the engine may further include reducing a coupling force of the second clutch to generate slip.

The method may further include: releasing the second clutch when the input speed of the transmission is less than a minimum threshold point, coupling the first clutch, and starting the engine; and generating slip of the second clutch. Further, the method may also include starting the engine when coupling of the second clutch is maintained and the input speed of the transmission exceeds (e.g., is greater than) a minimum speed of the engine. The motor may be configured to use a motor torque up to the limited torque within an EV driving mode.

Another exemplary embodiment of the present invention provides a clutch control apparatus for a hybrid vehicle, that may include: a first clutch that may selectively connect a motor and an engine; a second clutch that may selectively connect the motor and a transmission; and a controller configured to operate the first clutch and the second clutch, set a limited torque for the motor torque during EV driving; and adjust the motor to output a limited torque or less.

Further, the controller may be configured to generate slip of the second clutch, when mode converting from an EV driving mode to an HEV driving mode, and synchronize a speed of the motor and a speed of the transmission. Furthermore, the controller may be configured to use a motor torque exceeding the preset limited torque when an input speed of the transmission is equal to or greater than a minimum threshold point and is equal to or less than a minimum engine speed.

In addition, the controller may be configured to increase a speed of the motor using a motor torque that exceeds (e.g., is greater than) the preset limited torque, and couple the first clutch when an engine speed and a motor speed are synchronized. The controller may also be configured to release coupling of the second clutch, couple the first clutch, and start the engine to generate slip of the second clutch when converting from EV driving to HEV driving and when an input speed of the transmission is less than a minimum threshold point.

The controller may further be configured to start the engine when coupling of the second clutch is maintained when converting from EV driving to HEV driving and an input speed of the transmission exceeds a minimum speed of the engine. In addition, the controller may be configured to couple the first clutch when an engine speed and a motor speed are synchronized.

As described above, according to an exemplary embodiment of the present invention, when a hybrid vehicle driving mode is converted from an EV mode to an HEV mode using slip of a DCT, vehicle production cost may decrease and fuel consumption may improve. Further, by setting a limited torque, a motor and an engine may be synchronized without substantially reducing torque of a DCT, and acceleration linearity may be increased.

BRIEF DESCRIPTION OF THE DRAWINGS

The above and other features of the present invention will now be described in detail with reference to certain exemplary embodiments thereof illustrated in the accompanying drawings which are given herein below by way of illustration only, and thus are not limitative of the present invention, and wherein.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

In the following detailed description, only exemplary embodiments of the present invention have been shown and described, simply by way of illustration. As those skilled in the art would realize, the exemplary embodiments may be modified in various different ways, all without departing from the spirit or scope of the present invention. Like reference numerals designate like elements throughout the specification.

Figure 1:
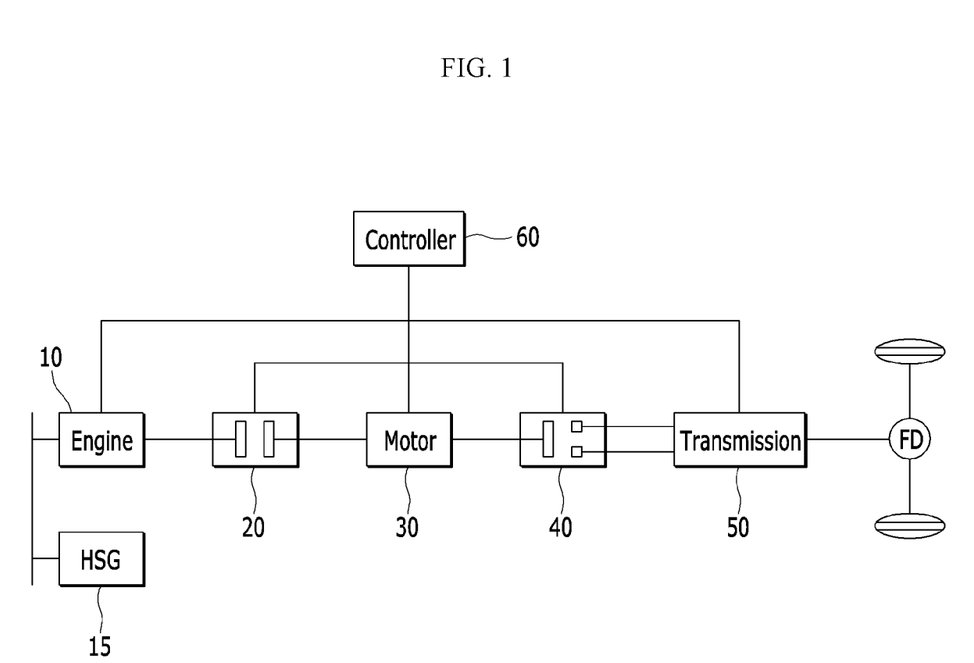
FIG. 1 is an exemplary block diagram illustrating a configuration of a clutch control apparatus of a hybrid vehicle according to an exemplary embodiment of the present invention.

An exemplary embodiment of the present invention will hereinafter be described in detail with reference to the accompanying drawings. FIG. 1 is an exemplary block diagram illustrating a configuration of a clutch control apparatus of a hybrid vehicle according to an exemplary embodiment of the present invention. Referring to FIG. 1, a clutch control apparatus of a hybrid vehicle may include an engine 10, a Hybrid Starter Generator (HSG) 15, an engine clutch 20, a motor 30, a Dual Clutch Transmission (DCT) 40, a transmission 50, and a controller 60. As shown in FIG. 1, the engine 10 may be connected to the motor 30 via the engine clutch 20, which may be a first clutch, the DCT 40, which may be a second clutch, may be connected to a shaft of the engine 10 and the motor 30, and the transmission 50 may be connected to the DCT 40. In the present specification, the first clutch is the engine clutch 20 and the second clutch is the DCT 40, but the first clutch and the second clutch are not limited thereto. For example, the second clutch may be an Auto Manual Transmission (AMT).

The HSG 15 may be configured to ignite fuel within a cylinder disposed within the engine 10 and may be connected to the engine 10. The HSG 15 may be a motor configured to start the engine 10. Further, when a surplus output occurs while the hybrid vehicle is running, the HSG 15 may be a generator configured to charge a battery. The engine clutch 20 may be disposed between the engine 10 and the motor 30 and may be configured to receive a control signal from the controller 60, thereby selectively connecting the engine 10 and the motor 30 based on a hybrid vehicle driving mode.

Within the DCT 40, a plurality of input gears may be dispersedly disposed within two input shafts, and a plurality of output gears may be gear coupled to the plurality of input gears, respectively, may be dispersedly disposed at two output shafts. Further, the DCT 40 may include a plurality of synchronizer mechanisms, and the plurality of synchronizer mechanisms may selectively connect one of a plurality of output gears and one of two output shafts. Furthermore, the DCT 40 may include two clutches. Each clutch may be configured to transfer power from a power source (e.g., an engine or a motor) to two input shafts. The clutch may be a dry or wet clutch.

In general, the motor 30 may use power that is charged within a battery when initially started and a driving torque that may be generated within the motor 30. The DCT 40 may be completely coupled to transfer power to a driving shaft. The sum of a motor output torque and an engine output torque, that may be determined based on coupling and release of the engine clutch 20, may be supplied as an input torque. Further, a random transmission level may be selected based on a vehicle speed and a driving condition to allow the transmission 50 to be configured to output a driving force to a driving wheel to maintain operation of the vehicle.

The controller 60 may be configured to switch a connection of the engine clutch 20 and the DCT 40 by outputting a control signal. In addition, the controller 60 may be configured to adjust a clutch within a hybrid vehicle using cooperative control between several controllers that are disposed within a hybrid vehicle. For example, a Hybrid Control Unit (HCU), which may be a superordinate controller, an Engine Control Unit (ECU) that may be configured to operate an entire engine operation, a Motor Control Unit (MCU) that may be configured to operate a drive motor, and a Transmission Control Unit (TCU) that may be configured to execute a transmission may be used. Therefore, for convenience of description, in the present specification and claims, several controllers disposed within a hybrid vehicle are referred to as a controller 60.

When the hybrid vehicle operates in an EV mode by setting a limited torque to a motor maximum torque, the controller 60 may be configured to execute the motor 30 to output a motor torque of a limited torque or less. Further, while the hybrid vehicle operates in an EV mode and converts to an HEV mode by generating slip of the DCT 40, the controller 60 may further be configured to synchronize a speed of the motor 30 and a speed of the transmission 50. Accordingly, the controller 60 may be configured to compare an input speed of the transmission and a minimum speed of the engine and determine coupling, slip, and release of the engine clutch 20 and the DCT 40 based on a value thereof. For such an object, the controller 60 may be implemented with at least one processor that uses a predetermined program, and the predetermined program may be programmed to perform each step of a method of controlling clutch slip of a hybrid vehicle according to an exemplary embodiment of the present invention.

Figure 2:
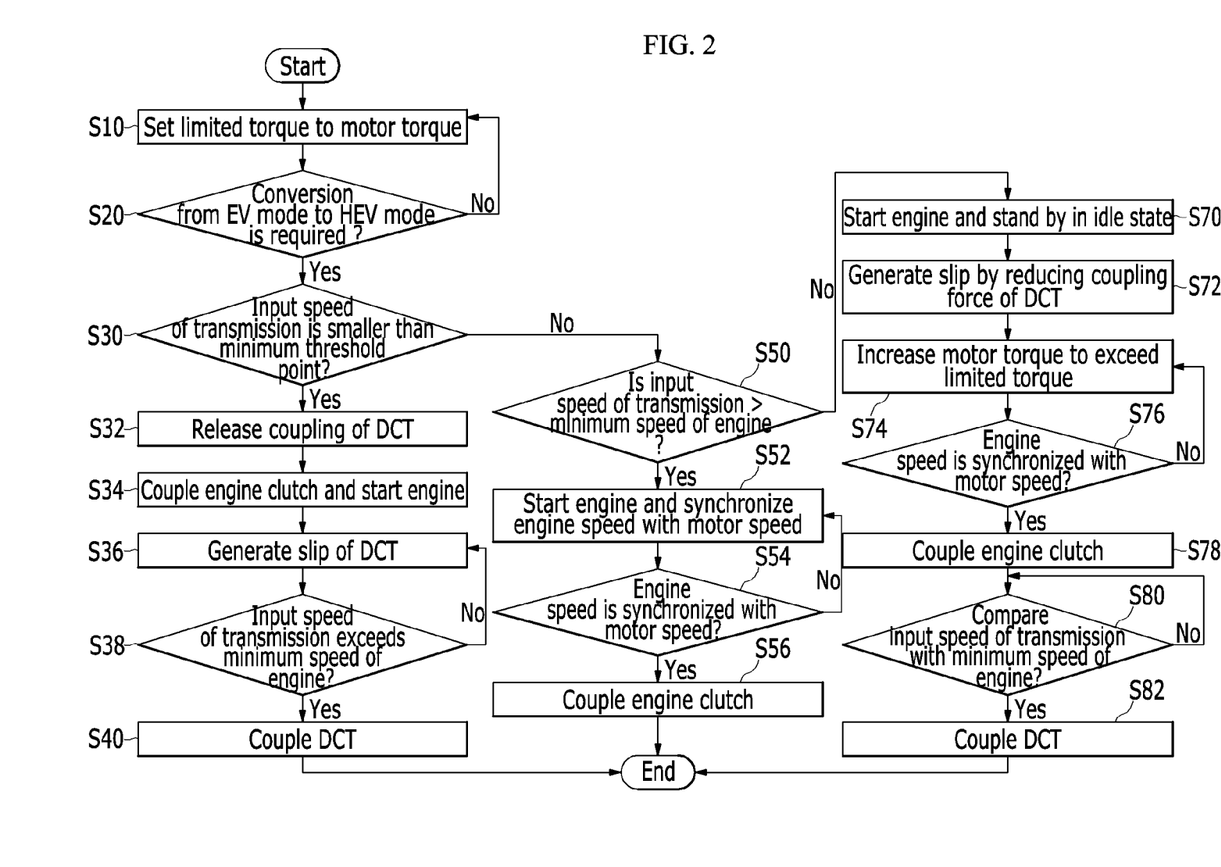
FIG. 2 is an exemplary flowchart illustrating a method of controlling a clutch of a hybrid vehicle according to an exemplary embodiment of the present invention.

Hereinafter, a method of controlling a clutch of a hybrid vehicle according to an exemplary embodiment of the present invention will be described in detail with reference to FIGS. 2 to 4. FIG. 2 is an exemplary flowchart illustrating a method of controlling a clutch of a hybrid vehicle according to an exemplary embodiment of the present invention. As shown in FIG. 2, a method of controlling a clutch of a hybrid vehicle may include setting a limited torque to a motor torque (S10), and determining whether conversion from an EV mode to an HEV mode is required (S20). When conversion from an EV mode to an HEV mode is required, the controller 60 may be configured to determine whether an input speed of the transmission 50 is less than a minimum threshold point (S30).

Further, when an input speed of the transmission 50 is less than a minimum threshold point, the hybrid vehicle may be stopped. In other words, a battery charge amount (SOC) of the hybrid vehicle may be depleted, a battery output may be limited in a substantially low temperature state, the motor 30 may have overheated, or the hybrid vehicle may have stopped while driving the motor 30 on a steep slope (e.g., substantially inclined) road. Therefore, in the present invention, an input speed of the transmission 50 may be less than a minimum threshold point, may include both when an input speed of the transmission 50 is about 0, and when an input speed of the transmission 50 is greater than about 0 but is less than a minimum threshold point that may be regarded as a hybrid vehicle has stopped.

When an input speed of the transmission 50 is less than a minimum threshold point, the controller 60 may be configured to release coupling of the DCT 40 (S32). The controller 60 may further be configured to couple the engine clutch 20 and start the engine 10 via the motor 30 or the HSG 15 (S34). When an input speed of the transmission 50 is less than a minimum threshold point, operation of the motor 30 may be impossible, and when the engine clutch 20 is coupled, the controller 60 may be configured to start the engine 10, which may directly transfer an engine driving torque to a driving shaft. Further, the controller 60 may be configured to generate slip of the DCT 40 (S36). When the engine 10 is initially started, sufficient torque may not be developed within the engine 10 due to a substantially low speed of the engine 10. Therefore, the controller 60 may be configured to generate slip of the DCT 40 to transfer a torque of the engine 10 to a driving shaft. Furthermore, the controller 60 may be configured to determine whether an input speed of the transmission 50 exceeds a minimum speed of the engine (S38). When an input speed of the transmission 50 exceeds a minimum speed of the engine, sufficient torque may exist within the engine 10 and the controller 60 may be configured to couple the DCT 40 (S40).

When an input speed of the transmission 50 is equal to or greater than a minimum threshold point S30, the controller 60 may be configured to compare the input speed of the transmission 50 and a minimum speed of the engine (S50). When an input speed of the transmission 50 is greater than a minimum threshold point S30, the hybrid vehicle may be operated. Particularly, when the input speed of the transmission 50 exceeds a minimum speed of the engine at process S50, the hybrid vehicle may operate within a normal EV mode. Therefore, when coupling of the DCT 40 is maintained, the controller 60 may be configured to start the engine 10 and synchronize an engine speed with a motor speed (S52).

When the controller 60 starts the engine 10 and increases an engine speed, the engine clutch 20 may not be coupled and thus an engine driving torque may not be transferred to a driving shaft. The controller 60 may be configured to determine an engine speed and a motor speed, and whether the engine speed and the motor speed are synchronized (S54). When the engine speed and the motor speed are synchronized, the controller 60 may be configured to couple the engine clutch 20 (S56) and the hybrid vehicle may drive in an HEV mode. When the input speed of the transmission 50 is equal to or less than a minimum speed of the engine, the controller 60 may be configured to start the engine 10 and stand by in an idle state (S70).

When an input speed of the transmission 50 is equal to or greater than a minimum threshold point and is equal to or less than a minimum speed of the engine at processes S30 and S50, the process may continue at process S70. When the input speed of the transmission 50 is equal to or greater than a minimum threshold point and is equal to or less than a minimum speed of the engine, the hybrid vehicle may operate at a substantially low speed within an EV mode. Thereafter, the controller 60 may be configured to generate slip of the DCT 40 (S72), by reducing a coupling force of the DCT 40 to a present motor torque level. Since a limited torque may be set to the motor torque at step S10, only a limited torque or less may be output.

When slip of the DCT 40 occurs, the controller 60 may be configured to release the limited torque and increase the motor torque to exceed the limited torque (S74). Accordingly, the controller 60 may be configured to operate the motor to output a maximum motor torque, which may rapidly increase a motor speed. Further, the controller 60 may be configured to determine an engine speed and a motor speed and whether the engine speed is synchronized with the motor speed (S76).

When the engine speed is synchronized with the motor speed, the controller 60 may be configured to couple the engine clutch 20 (S78). When the engine clutch 20 is coupled to the DCT 40, which may maintain a slip state, a vehicle speed of the hybrid vehicle may increase. The controller 60 may be configured to compare an input speed of the transmission 50 and a minimum speed of the engine (S80). When an input speed of the transmission 50 exceeds a minimum speed of the engine, the controller 60 may be configured to terminate a slip state of the DCT 40 and couple the DCT 40 to transfer a torque to a driving shaft (S82).

Figure 3:
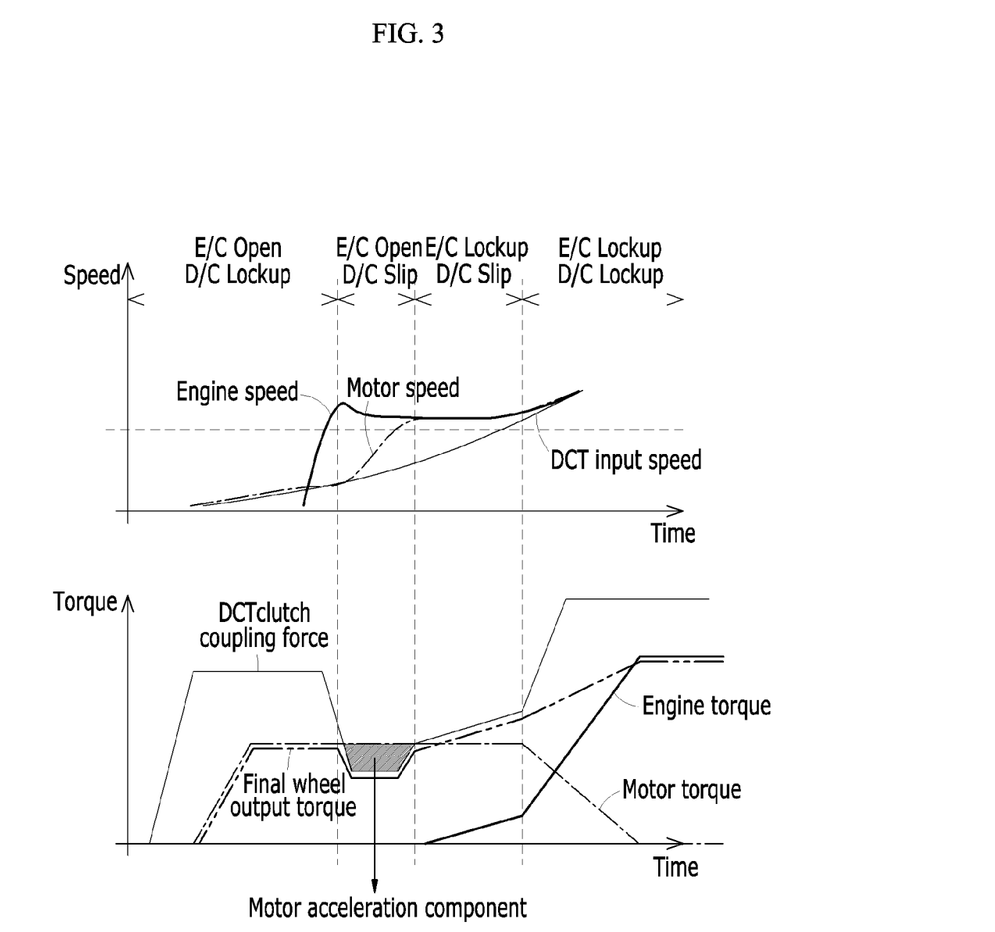
FIG. 3 is an exemplary graph illustrating a relationship between speed and torque, and a clutch coupling force relative to time, when a driving mode is converted in a conventional hybrid vehicle.
Figure 4:
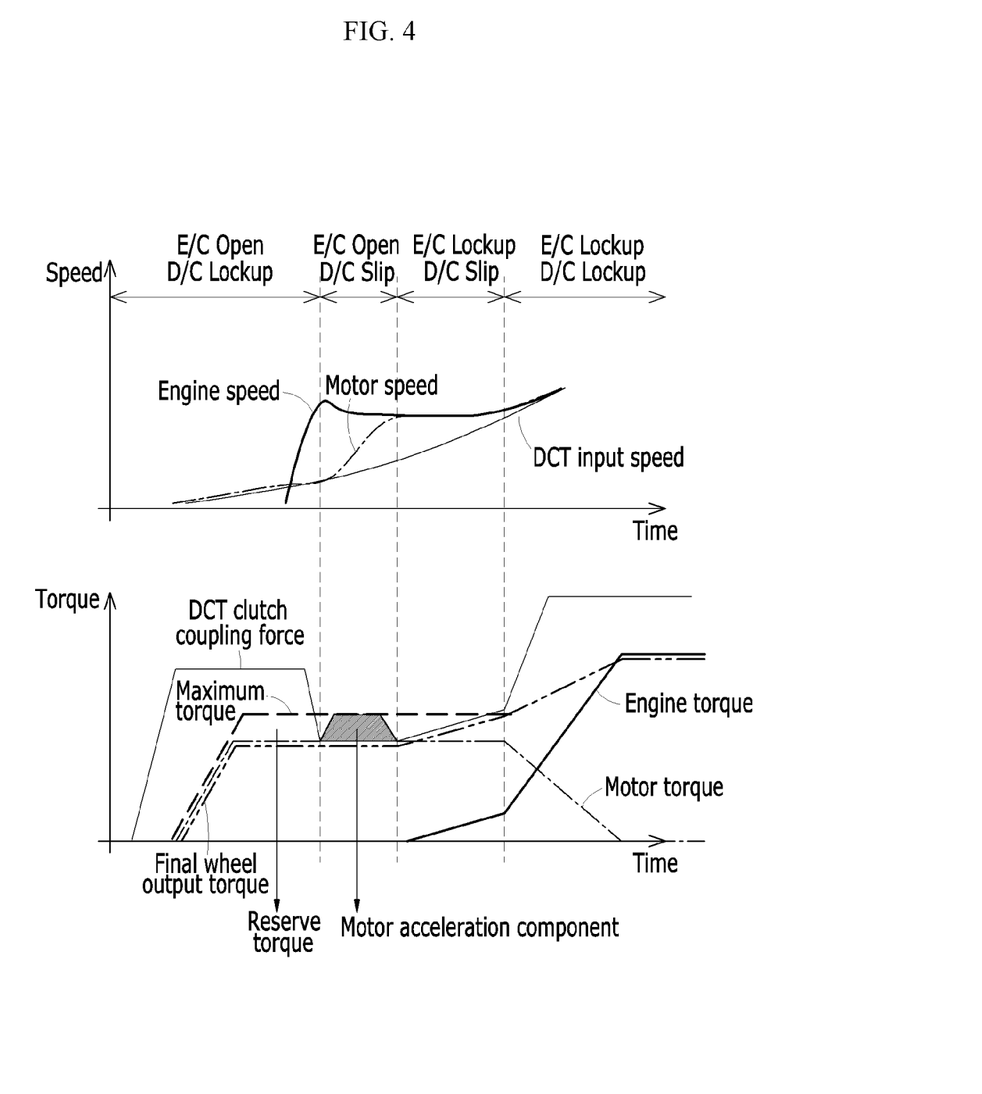
FIG. 4 is an exemplary graph illustrating a relationship between speed and torque, and clutch coupling force relative to time, when a hybrid vehicle driving mode is converted according to an exemplary embodiment of the present invention.

FIG. 3 is an exemplary graph illustrating a relationship between a speed and a torque, and a clutch coupling force relative to time, when a driving mode is converted in a conventional hybrid vehicle, and FIG. 4 is an exemplary graph illustrating a relationship between a speed and a torque, and a clutch coupling force relative to time, when a driving mode of a hybrid vehicle is converted according to an exemplary embodiment of the present invention. As shown in FIG. 3, a coupling force (frictional force) of the DCT 40 may be reduced to a motor torque or less to generate slip of the DCT 40. In particular, within a slip state of the DCT 40, when a motor speed is synchronized with an engine speed, the engine clutch 20 may be coupled. Accordingly, within a conventional hybrid vehicle, a coupling force of the DCT 40 may be further decreased to increase a speed of a motor, which may further decrease a wheel torque and acceleration linearity.

As shown in FIG. 4, the hybrid vehicle according to an exemplary embodiment of the present invention may set a limited torque and adjust a motor to output a motor torque to a limited torque or less during EV driving. Therefore, slip of the DCT 40 may occur when reducing a coupling force of the DCT 40. Further, when a motor maximum torque exceeds a limited torque, a constant wheel torque may be maintained by releasing a limited torque. Within a hybrid vehicle according to an exemplary embodiment of the present invention, power performance based on a torque output not used by setting a limited torque may be obtained by advancing when an EV mode is converted to an HEV mode.

As described above, according to an exemplary embodiment of the present invention, by limiting an output of a motor torque, a torque of the DCT 40 may not be significantly reduced and a motor and an engine may be synchronized, and acceleration linearity may be improved by maintaining a constant wheel torque.

While this invention has been described in connection with what is presently considered to be exemplary embodiments, it is to be understood that the invention is not limited to the exemplary embodiments. On the contrary, it is intended to cover various modifications and equivalent arrangements included within the spirit and scope of the appended claims.

What is claimed is:

1. A method of controlling a clutch of a hybrid vehicle comprising a motor selectively connected to a transmission through a second clutch and an engine selectively connected to the motor through a first clutch, the method comprising:
    limiting, by a controller, a maximum output of a motor torque in an Electric Vehicle (EV) driving mode to a preset torque;
    comparing, by the controller, an input speed of the transmission and a minimum speed of the engine when converting from the EV driving mode to a Hybrid Electric Vehicle (HEV) driving mode;
    starting, by the controller, the engine when the input speed of the transmission is equal to or greater than a minimum threshold point and is equal to or less than the minimum speed of the engine;
    generating, by the controller, slip of the second clutch by reducing a coupling force of the second clutch to the preset torque;
    increasing, by the controller, the motor torque to exceed the preset torque while generating the slip of the second clutch;
    coupling, by the controller, the first clutch when the engine speed and a motor speed are synchronized; and
    coupling, by the controller, the second clutch when the input speed of the transmission exceeds the minimum speed of the engine.

2. The method of claim 1, further comprising:
    releasing, by the controller, the second clutch when the input speed of the transmission is less than the minimum threshold point;
    coupling, by the controller, the first clutch and starting the engine; and
    generating, by the controller, slip of the second clutch.

3. The method of claim 1, further comprising:
    starting, by the controller, the engine when coupling of the second clutch is maintained and the input speed of the transmission exceeds the minimum speed of the engine.

4. The method of claim 1, wherein the motor is configured to use the motor torque up to the limited torque in the EV driving mode.

5. The method of claim 1, further comprising:
    controlling, by the controller, the engine to maintain an idle state while generating the slip of the second clutch.

6. The method of claim 1, wherein a wheel torque is constantly maintained while the slip of the second clutch is generated.

7. A clutch control apparatus of a hybrid vehicle, the clutch control apparatus comprising:
    a first clutch that selectively connects a motor and an engine configured to generate power;

a second clutch that selectively connects the motor and a transmission; and a controller configured to:
operate the first clutch and the second clutch,
limit a maximum output of a motor torque in an Electric Vehicle (EV) driving mode to a preset torque;
compare an input speed of the transmission and a minimum speed of the engine when converting from the EV driving mode to a Hybrid Electric Vehicle (HEV) driving mode;
start the engine when the input speed of the transmission is equal to or greater than a minimum threshold point and is equal to or less than the minimum speed of the engine;
generate slip of the second clutch by reducing a coupling force of the second clutch to the preset torque;
increase the motor torque to exceed the preset torque while the slip of the second clutch is generated;
couple the first clutch when the engine speed and a motor speed are synchronized; and
couple the second clutch when the input speed of the transmission exceeds the minimum speed of the engine.

8. The clutch control apparatus of claim 7, wherein the controller is further configured to:
release the second clutch when the input speed of the transmission is less than the minimum threshold point;
couple the first clutch and start the engine; and
generate slip of the second clutch.

9. The clutch control apparatus of claim 7, wherein the controller is further configured to:
start the engine when coupling of the second clutch is maintained and the input speed of the transmission exceeds the minimum speed of the engine.

10. A non-transitory computer readable medium containing program instructions executed by a processor or controller, the computer readable medium comprising:
program instructions that limit a maximum output of a motor torque in an Electric Vehicle (EV) driving mode to a preset torque;
program instructions that compare an input speed of the transmission and a minimum speed of the engine when converting from the EV driving mode to a Hybrid Electric Vehicle (HEV) driving mode;
program instructions that start the engine when the input speed of the transmission is equal to or greater than a minimum threshold point and is equal to or less than the minimum speed of the engine;
program instructions that generate slip of the second clutch by reducing a coupling force of the second clutch;
program instructions that increase the motor torque to exceed the preset torque while generating the slip of the second clutch;
program instructions that couple the first clutch when the engine speed and a motor speed are synchronized; and
program instructions that couple the second clutch when the input speed of the transmission exceeds the minimum speed of the engine.

11. The non-transitory computer readable medium of claim 10, wherein the program instructions that start the engine includes program instructions that generate slip by reducing a coupling force of the second clutch.

12. The non-transitory computer readable medium of claim 10, further comprising:
program instructions that release the second clutch when the input speed of the transmission is less than the minimum threshold point;
program instructions that couple the first clutch and starting the engine; and
program instructions that generate slip of the second clutch.

13. The non-transitory computer readable medium of claim 10, further comprising program instructions that start the engine when coupling of the second clutch is maintained and the input speed of the transmission exceeds the minimum speed of the engine.

* * * * *